United States Patent

Erickson et al.

[11] 3,727,478
[45] Apr. 17, 1973

[54] SPEED CONTROLLED BELT TRANSMISSION

[75] Inventors: Albin Erickson; William R. Richards; Clement F. Deschene, all of Roseau, Minn.

[73] Assignee: Textron Inc., Providence, R.I.

[22] Filed: Aug. 23, 1971

[21] Appl. No.: 174,148

Related U.S. Application Data

[63] Continuation of Ser. No. 869,166, Oct. 24, 1969, abandoned.

[52] U.S. Cl....................74/230.17 E, 192/105 C
[51] Int. Cl............................F16d 43/06, F16h 55/52
[58] Field of Search.....................74/230.17 E; 192/105 C, 105 B, 103 A, 105 CP

[56] References Cited

UNITED STATES PATENTS

| 3,291,274 | 12/1966 | Wyman | 192/105 C |
|---|---|---|---|
| 3,266,330 | 8/1966 | Galleher | 192/103 A |
| 2,171,833 | 9/1939 | Lewis | 192/105 C |
| 3,091,315 | 5/1963 | Maurice et al. | 192/105 C |
| 2,406,244 | 8/1946 | Nutt | 192/99 A |
| 3,091,315 | 5/1963 | Maurice et al. | 192/105 C |
| 3,266,330 | 8/1966 | Galleher | 192/103 A |
| 3,291,274 | 12/1966 | Wyman | 192/105 C |
| 1,950,581 | 3/1934 | Thomas | 192/105 C X |
| 2,171,833 | 9/1939 | Lewis | 192/105 C |
| 2,378,549 | 6/1945 | Gruenhagen | 74/230.17 E |
| 2,496,201 | 1/1950 | Dodge | 192/105 B X |
| 2,521,457 | 9/1950 | Heyer | 74/230.17 E |

*Primary Examiner*—Benjamin W. Wyche
*Attorney*—Merchant & Gould

[57] ABSTRACT

The disclosure is directed to an improved centrifugal clutch the structure of which permits its use with engines having different performance characteristics, and enables simple modification resulting in a desired performance relationship with the selected engine. One feature centers on a plurality of flyweights, each having an engageable cam surface that relates engine revolutions-per-minute to the input/output revolution ratio to effect a simulated gear shifting transmission characteristic. Other features are directed to laminated flyweights made of different materials to obtain the proper centrifugal action, and the mounting of flyweights having predetermined centers of mass to obtain the greatest mechanical advantage at the optimum time.

12 Claims, 11 Drawing Figures

PATENTED APR 17 1973

INVENTORS.
ALBIN R. ERICKSON
WILLIAM R. RICHARDS
CLEMENT F. DESCHENE
BY
Merchant & Gould
ATTORNEYS INVENTORS.
ALBIN R. ERICKSON
WILLIAM R. RICHARDS
CLEMENT F. DESCHENE
BY
Merchant & Gould
ATTORNEYS

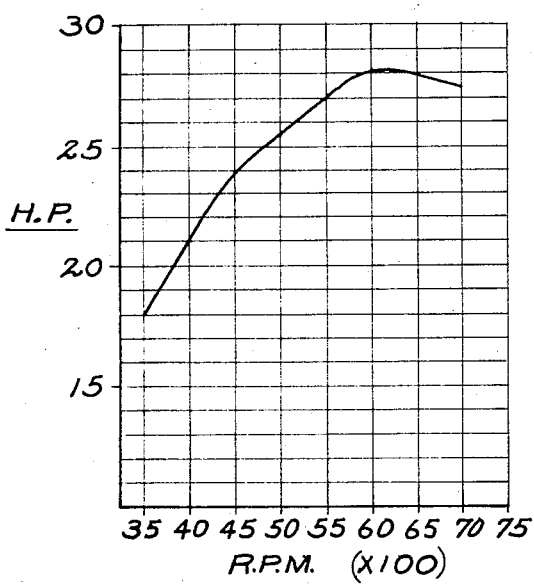
Fig. 8
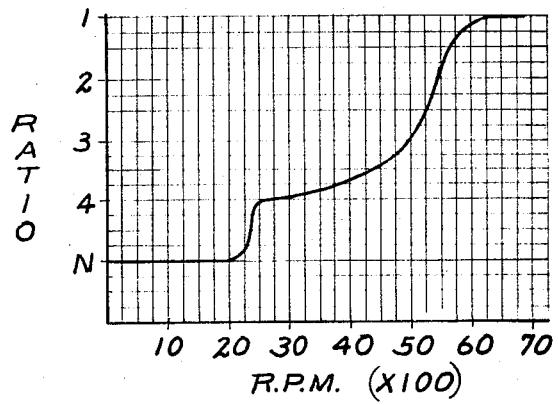
Fig. 9
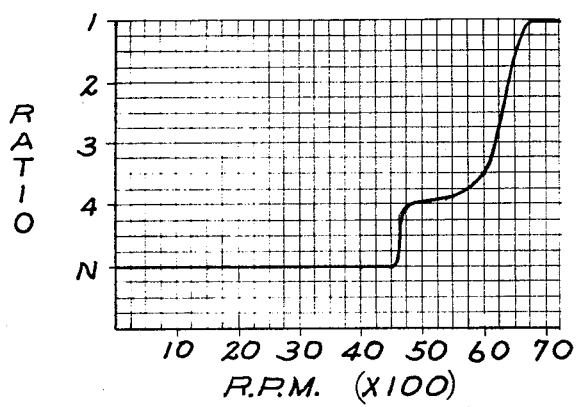
Fig. 10
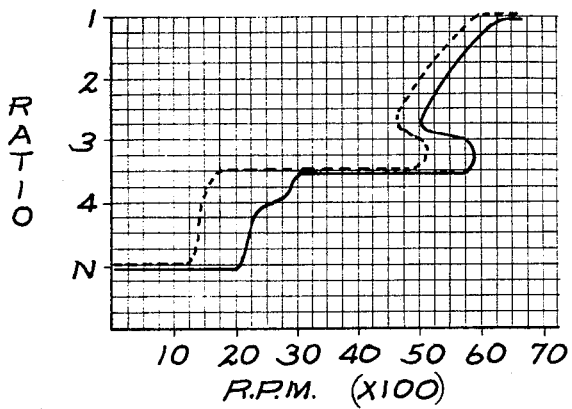
Fig. 11
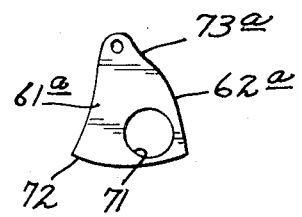
INVENTORS.
ALBIN R. ERICKSON
WILLIAM R. RICHARDS
CLEMENT F. DESCHENE
BY
Merchant & Gould
ATTORNEYS

SPEED CONTROLLED BELT TRANSMISSION

This application is a continuation of application serial number 869,166, filed October 24, 1969, and now abandoned.

The invention falls within the art of centrifugal clutches, and finds application in centrifugal clutches consisting of driving and driven assemblies to vary the ratio of input shaft rotation to output shaft rotation.

Centrifugal clutches of this specific type find particular application in conjunction with smaller internal combustion engines where the use of gear transmissions is impractical or too costly. By providing a variable ratio of input to output rotational speed, the clutch serves as both clutch and transmission.

One specific application of variable ratio centrifugal clutches is in snowmobiles. In this field of industry, as well as many other, the manufacturer is faced with the problem of designing a clutch assembly that will match the performance characteristics of each engine in a number of different models. The problem is enlarged with usage of different types of engines (i.e., two-cycle, four-cycle, rotary) the performance characteristics of which are individually distinct.

Obviously, it is to the advantage of the manufacturer from the standpoint of uniformity, simplicity, economy of manufacture, etc., to have at his disposal a variable ratio centrifugal clutch that can be used in all models. Our invention is directed to such a clutch the structure of which permits, by the interchange of easily removable parts, not only matching of the clutch performance characteristics to a particular engine but also enables the clutch to fully simulate a transmission in its control of the engine output.

Another structural feature of the invention gives the clutch its greatest mechanical advantage in an optimum range on its performance curve, resulting in a more efficient transfer of energy from the engine to the driving mechanism of the vehicle.

BRIEF DESCRIPTION OF THE DRAWINGS

FIG. 8 is a graph showing a typical operating curve for a small internal combustion engine;

FIG. 9 is a side view of a flyweight for the centrifugal clutch, and a graph having an operating curve for a clutch using the flyweight;

FIG. 10 is a side view of an alternative flyweight for the centrifugal clutch, and a graph having a clutch performance curve; and FIG. 11 is another alternative flyweight for the centrifugal clutch, and a graph indicating the clutch performance it effects.

DESCRIPTION OF THE PREFERRED EMBODIMENT

Figure 1:
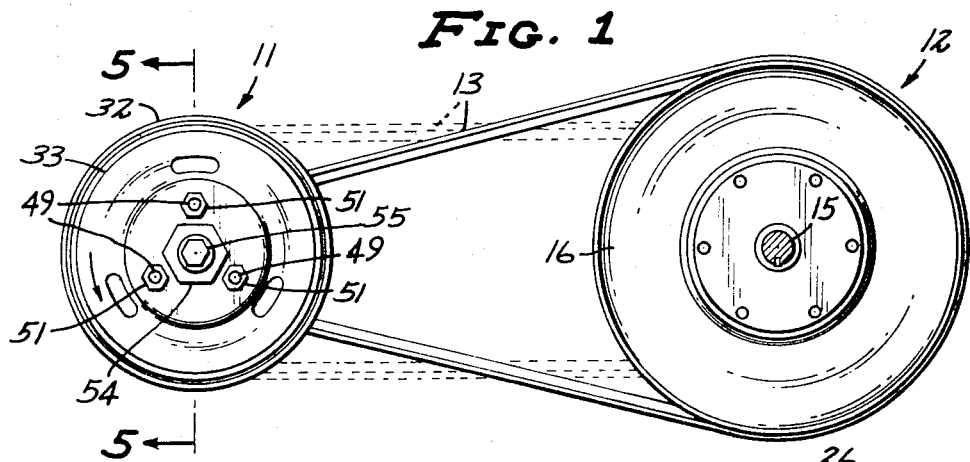
FIG. 1 is a side elevational view of a variable ratio centrifugal clutch consisting of a driving portion and a driven portion.
Figure 2:
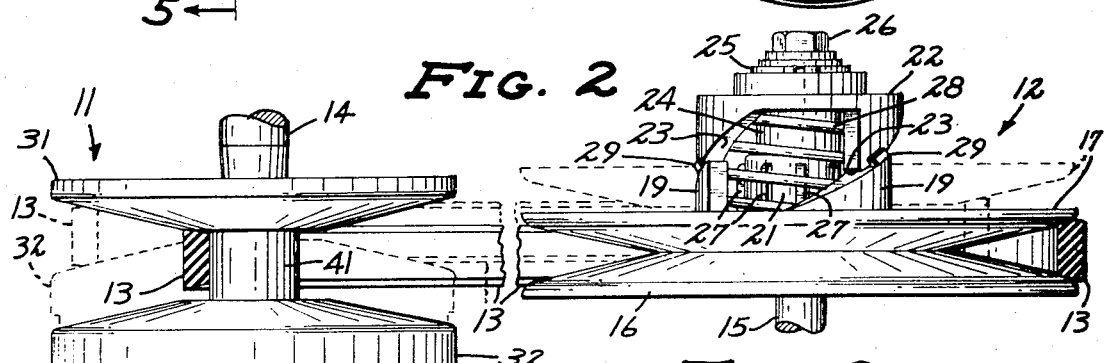
FIG. 2 is a top elevational view of the variable ratio centrifugal clutch on an enlarged scale and with portions thereof broken away.

In FIG. 1, a variable ratio centrifugal clutch is shown, consisting of a driving assembly 11 and a driven assembly 12 interconnected by an endless belt 13. Referring additionally to FIG. 2, driving assembly 11 is shown to be mounted on an output drive shaft 14 of a power plant (not shown), while driven assembly 12 is mounted on an output shaft 15 adapted for connection with a utilization device (not shown). Driven assembly 12 consists of a stationary sheave 16 and a sheave 17 that is axially movable on shaft 15 as discussed below.

Forming part of sheave 17 are three ramp sections 19 (only two of which can be seen in FIG. 2) and a hub 21. A ramp member 22 includes three ramp surfaces 23 corresponding to ramp sections 19, and a central portion 24 which is suitably secured to shaft 15 such as by a slot and key or splining. A spring 28 is disposed in compression between sheave 17 and member 22 by a split locking ring 25 and the entire assembly is held in place by bolt 26 which threads into shaft 15. Hub 21 has a plurality of spacers 27 which keep spring 28 in proper alignment.

As assembled, sheave 17 is normally urged toward stationary sheave 16 by spring 28, but by application of a proper force spring 28 can be overcome so that sheave 17 moves both rotationally and axially by virtue of ramp sections 19 engaging ramp surfaces 23. In order to prevent excess wear therebetween, ramp surfaces 23 are provided with pads 29 which also provide a desired frictional relation between the two.

Figure 4:
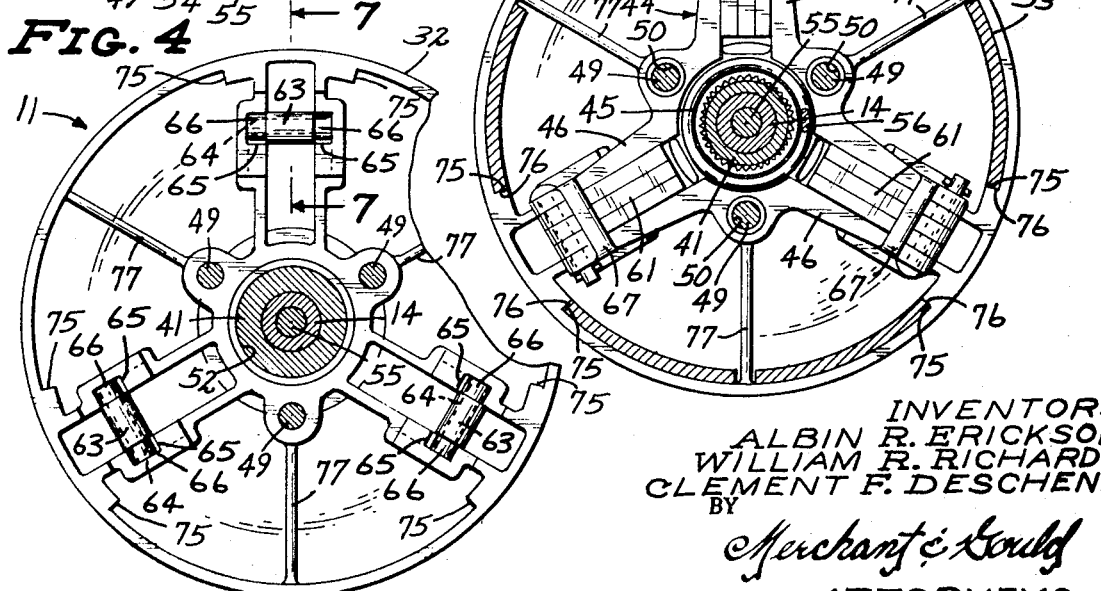
FIG. 4 is the same as FIG. 3 with parts thereof removed.

Driving assembly 11 also has a stationary sheave 31 fixed on shaft 14 and a movable sheave 32 (see also FIG. 4) that forms part of a movable housing 33. Housing 33 is normally urged away from sheave 31, but in response to an increasing angular velocity of shaft 14 moves axially forward as shown by the dotted lines in FIG. 2. Belt 13 normally occupies a slack position against shaft 14 when driving assembly 11 revolves slowly, but as housing 33 progresses axially it is forced radially outward, also as represented by dotted lines.

With the movement of belt 13 radially outward on driving assembly 11, movable sheave 17 of driven assembly 12 also begins to move away from sheave 16 against the bias of spring 28. However, before this can occur the coefficient of static friction existing between pads 29 and ramp sections 19 must be overcome. Rotation of both assemblies 11 and 12 is in the counter-clockwise direction as seen in FIG. 1, so that when the static friction of pads 29 and the biasing force of spring 28 are overcome sheave 17 moves clockwise against belt movement, and the gripping force between belt 13 and sheaves 16 and 17 therefore remains great. Thus, for increasing angular velocity of shaft 14, housing 33 approaches stationary sheave 31 to move belt 13 radially outward from its slack position, which in turn causes belt 13 to move radially inward with respect to driving assembly 12, resulting in rotational movement of output shaft 15.

Since the radial position of belt 13 with respect to sheaves 31 and 32 of driving assembly 11 and sheaves 16, 17 of driven assembly 12 varies as a function of the angular velocity of shaft 14, it follows that the ratio of revolutions of the shaft 14 to revolutions of the shaft 15 also varies as a function of shaft 14 speed. At low rpm's, this ratio is infinite since shaft 14 revolves but belt 13, in its slack position, is unable to transmit rotational energy to driven assembly 12, and output shaft 15 cannot revolve. With increasing rpm's by shaft 14, this ratio is decreased since the radial distance of belt 13 from shaft 14 is increasing while its distance from that of shaft 15 is decreasing. By virtue of its variable ratio feature, the centrifugal clutch performs the function of both clutch and transmission.

FIG. 8 is an operating curve for a typical small displacement internal combustion engine that relates engine horsepower to engine revolutions-per-minute. The curve indicates that the engine develops the least horsepower at low rpm's, and with increasing rpm's there is also an increase in power. It therefore becomes important to properly match performance characteristics of a clutch to that of the engine so that the mechanical advantage of the clutch, which is greater at low rpm's by virtue of its turns ratio, complements the engine horsepower, which is greater at high rpm's, to provide optimum performance throughout the range of engine rmp's. This is best achieved by preventing engagement of the clutch until sufficient horsepower is developed by the engine and thereafter controlling the clutch turns ratio as described below.

Figure 5:
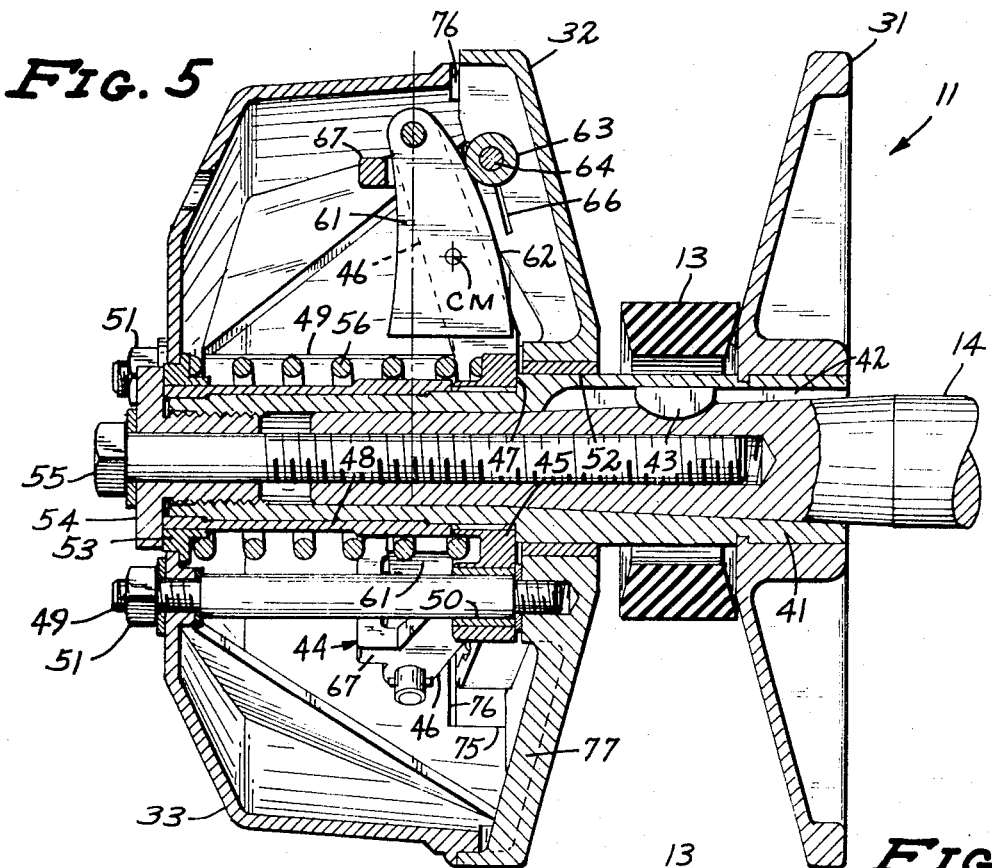
FIG. 5 is an enlarged sectional view of the clutch driving portion in one operating position, taken along line 5—5 of FIG. 1.
Figure 6:
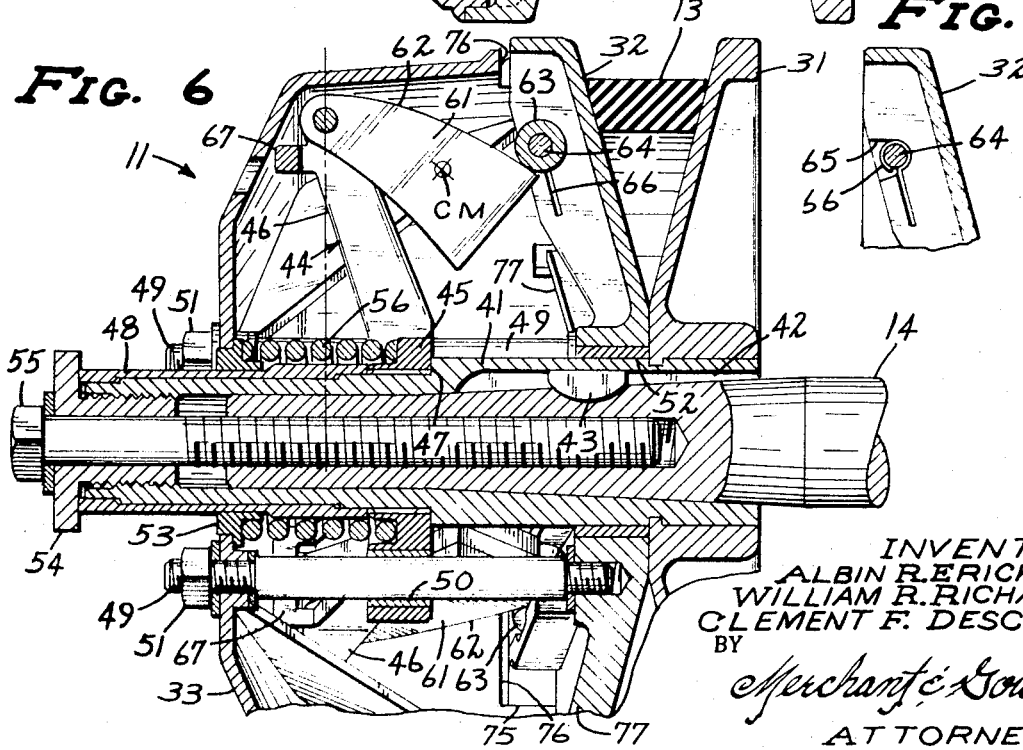
FIG. 6 is a view of FIG. 5 taken in another operating position, portions thereof broken away.

Referring to FIG. 5, which shows driving assembly 11 in detail, it can be seen that shaft 14 has a tapered end which receives an elongated sleeve 41. Sleeve 41 is affixed to shaft 14, by means of a slot 42 and a key 43, so that both members rotate together. Fixed sheave 31 is splined on sleeve 41 for rotation therewith.

A spider 44 consisting of a hub 45 and three radially extending arms 46 (see also FIG. 3) is splined on sleeve 41 for rotation therewith, and also abuts a stepped portion 47 of sleeve 41 to prevent axial movement to the right. Each of the arms 46 has an alignment hole 50 the purpose of which is described below. A keeper 48 slides over sleeve 41 and abuts the opposite side of hub 45 to prevent axial movement of spider 44 to the left.

Movable sheave 32 and movable housing 33 are formed with slightly different diameters which allow an overlapped sealing relationship. Sheave 32 and housing 33 are held together by three studs 49 the right ends of which pass through alignment holes 50 and screw into movable sheave 32, with the left ends extending through openings in housing 33. With sheave 32 disposed on the right side of spider 44 and housing 33 disposed on the left side of spider 44, a nut 51 is screwed on each of the studs 49 to draw the two movable members into a tight, sealed relation. Movable sheave 32 includes a bearing surface 52 which rides on sleeve 41 and forms a seal therewith. For the same purpose, housing 33 is provided with a collar 53 forming a bearing surface. This structural arrangement enables sheave 32 and housing 33 to completely enclose spider 44, thus preventing exposure to damaging substances. Studs 49 passing through holes 50 permit an aligned, axial movement of sheave 32 and housing 33 on sleeve 41, and simultaneously carry these enclosure members in rotational movement.

The entire assembly is held in place by a cap 54 which is threaded into sleeve 41 to abut keeper 48. A central bolt 55 screws into a threaded portion of shaft 14 to bring shaft 14 and sleeve 41 into tight frictional engagement.

The movable portion of driving assembly 11, which consists of movable sheave 32, movable housing 33 and collar 53, is normally biased to the left against cap 54 by a spring 56 mounted in compression between hub 45 of spider 44 and collar 53.

Figure 3:
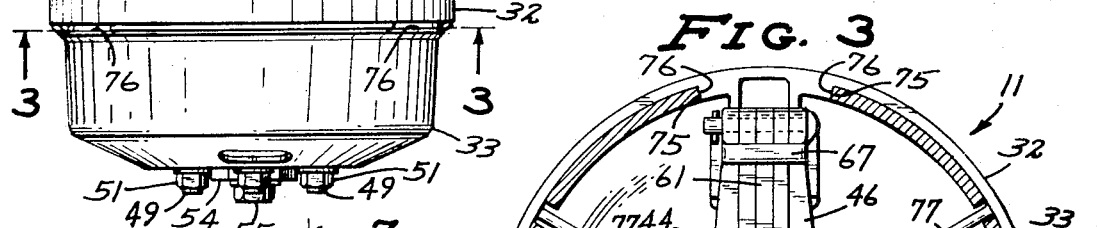
FIG. 3 is an enlarged cross-sectional view of the centrifugal clutch driving portion taken along the line 3—3 of FIG. 2.
Figure 7:
FIG. 7 is a fragmentary sectional view of a roller retaining member, taken along the line 7—7 of FIG. 4, on an enlarged scale.

Pivotally connected to each of the arms 46 of spider 44 is a flyweight 61 having a predetermined shape and mass. The leading edge of each flyweight 61 forms a cam surface 62 that engages a low friction roller 63 carried by movable sheave 32. Roller 63 is carried by an axle 64 which, as shown in FIG. 7, is inserted into a recess 65 and held in place by a retainer chip 66 on each end. As seen in FIG. 3, each of the flyweights 61 is made up of several laminations of the same or different materials in order to provide a desired mass.

There are several important aspects regarding the shape and disposition of the flyweights 61. First, each flyweight 61 is mounted so that its center of mass (C.M.) normally lies immediately adjacent a line perpendicular to shaft 14 and extending through the flyweight pivotal support point, with the distance between the center of mass and the line increasing as a direct function of rotational velocity of shaft 14. Consequently, the force imparted to roller 63 by flyweight 61 increases exponentially because the radially outward centrifugal force as well as the effective moment arm through which it operates increases with increasing shaft speed. This is desirable since, as mentioned above, the clutch should not transmit power to driven assembly 12 until a sufficient shaft speed has been reached; after engagement mechanical advantage of the clutch should increase commensurate with the load. The shape of the flyweights 61 must also be such that the center of mass lies to the right of the vertical line passing through the pivotal support point when the clutch is at rest. Thus, as the unit begins to rotate the flyweights necessarily rotate in a counterclockwise fashion about their pivotal support points to insure movement of sheave 32 toward sheave 31. To prevent clockwise movement of flyweights 61, each of the arms 46 of spider 44 also includes a stop 67 (FIGS. 3 and 5) that forms a cage for the weights.

In addition to location of the center of mass and the manner in which flyweights 61 are pivotally mounted, the shape of cam surface 62 is a significant factor in determining clutch operation. In FIG. 9, a flyweight 61 and a corresponding graph indicating the resulting shift pattern between the driving and driven assemblies is shown. The letter N on the graph represents neutral, or the point at which the ratio of input revolutions to output revolutions approaches infinity. When used with an engine having a performance characteristic as shown in FIG. 8, the smooth, arcuate cam surface 62 of flyweight 61 prevents clutch engagement until the engine speed exceeds 2000 rpm's. At this point, centrifugal force causes the flyweights 61 to move in a counterclockwise direction against rollers 63 to bring sheave 32 toward sheave 31. This causes belt 13 to move radially inward on driven assembly 12, and the revolution ratio moves quite rapidly to approximately 4. Thereafter, an increase in engine rpm's is accompanied by increased horsepower (FIG. 8) and an increased revolution ratio resulting in higher speed with more power.

In FIG. 10, a racing flyweight 61a is disclosed. Flyweight 61a has an irregular cam surface 62a with a recessed portion 73a which is a factor in preventing clutch engagement until almost 5000 rpm's are developed by the engine, as seen in the corresponding graph. Recess 73a resists radial outward movement of flyweight 61a and thereby maintains sheave 32 in a constant axial position over a predetermined range or rotational speed of shaft 14.

Also a factor in bringing about this effect are a hole 71 formed in flyweight 61a and a tail portion 72 that extends further to the left than that of flyweight 61. These two structural modifications cause the center of mass of flyweight 61a to be moved somewhat to the left, thereby reducing the moment arm distance as defined above. Thus, the engine must develop a relatively high speed before the turns ratio of 4 is realized, and this is, according to FIG. 8, at relatively high horsepower. The shift pattern continues through this narrow range of power, resulting in performance that is accompanied by a high level of horsepower.

The cam surface 62b of flyweight 61b includes a recess 73b at an intermediate point which results in a shift pattern according to the accompanying graph. In this case, as with flyweight 61, clutch engagement occurs at approximately 2000 rpm's, but the revolution ratio is set at 3.5. Rather than decreasing from that point in accordance with increases of engine rpm's, the revolution ratio continues at 3.5 until engine speed reaches almost 6000 rpm's. At that point, the revolution ratio begins to decrease as before (even for a slight decrease in engine speed) to effect higher output speed with high power. The plateau at which the revolution ratio remains from approximately 3000 to 6000 rpm's is particularly useful where delay in action is desired, such as with garden tractors or forklifts.

The graph of FIG. 11 also includes a dotted line representing the downshift characteristic, which indicates a hysteresis-like effect. According to this portion of the graph, once the plateau corresponding to the 3.5 revolution ratio is reached, it is extended on the downshift pattern to the 2000 rpm level before the clutch begins to disengage.

The curves of FIGS. 9 – 11 indicate that by varying the shape of the flyweight cam surface, by altering its mass by interchanging laminations of different materials or by controlling the center of mass location as shown, not only can the clutch be best matched to a selected engine, but the clutch can control the engine output to achieve a desired performance characteristic.

What is claimed is:

1. A variable ratio centrifugal clutch driving assembly adapted for connection with a driven assembly by means of an endless belt, comprising:
    a. a rotatable shaft;
    b. a first rotatable member comprising a first sheave mounted on the shaft for rotation therewith and axially stationary thereon;
    c. a second rotatable member comprising a second sheave mounted on the shaft for rotation therewith and axially movable relative to the first sheave to variably control the radial position of an endless belt disposed therebetween;
    d. a third rotatable member mounted on the shaft for rotation therewith and axially stationary thereon;
    e. and a plurality of flyweights pivotally mounted one one of the second and third rotatable members and arranged to move radially outward with increasing rotational velocity of the shaft;
    f. each flyweight forming a cam surface characterized to effect a predetermined mode of movement of the second sheave with respect to the first sheave, said surface being engageable with cam engaging means disposed on the other of said second and third rotatable members to effect said mode of movement;
    g. and each flyweight having a predetermined center of mass and being supported so that said center of mass lies in an at rest position adjacent a line perpendicular to the shaft axis and extending through the pivotal support to maintain the moment arm through which the flyweight acts essentially ineffective below a predetermined rotational velocity of the shaft means and substantially preclude axial movement of said second rotatable member until said predetermined rotational velocity of the shaft has been attained, the distance between the center of mass and said line increasing as a direct function of rotational velocity of the shaft.

2. The centrifugal clutch defined by claim 1, wherein the flyweights are mounted on the third rotatable member.

3. The centrifugal clutch defined by claim 1, wherein the third rotatable member comprises a hub with a plurality of arm extending radially outward therefrom, and a flyweight is mounted on the outer end of each arm.

4. The centrifugal clutch defined by claim 3, wherein a low friction roller for each flyweight is mounted on the second rotatable member for rolling engagement therewith.

5. The centrifugal clutch defined by claim 1, wherein the flyweights are formed from a plurality of constituent parts.

6. The centrifugal clutch defined by claim 5, wherein at least two of the constituent parts are of different material.

7. The centrifugal clutch defined by claim 5, wherein the constituent parts are removably connected to permit interchangeability.

8. The centrifugal clutch defined by claim 1, wherein each flyweight comprises a plurality of weight members of essentially the same shape joined to form a laminate structure.

9. The centrifugal clutch defined by claim 1, wherein each flyweight cam surface includes a recessed portion disposed to resist said radially outward movement and thereby maintain said first and second rotatable members in a predetermined relative axial position in accordance with a predetermined range of rotational speed of the shaft.

10. The centrifugal clutch defined by claim 9, wherein the recessed portion of the cam surface is disposed to engage said other rotatable member as the shaft begins to rotate.

11. The centrifugal clutch defined by claim 9, wherein the cam surface recess portion is disposed to engage said other rotatable member through an intermediate range of shaft rotational speed.

12. A centrifugal clutch adapted for use with an endless belt, comprising:

a. rotatable shaft means;
b. a first rotatable member mounted on the shaft means and defining a first sheave, the first rotatable member being axially stationary on the shaft means;
c. a second rotatable member mounted on the shaft means and defining a second sheave, the second rotatable member being axially movable on the shaft means to effect relative axial movement between the first and second sheaves and thereby vary the effective diameter therebetween;
d. a third rotatable member mounted on the shaft means and axially stationary thereon;
e. and a plurality of flyweights pivotally mounted on one of said second and third rotatable members and arranged to move radially outward with increasing rotational velocity of the shaft means, each of the flyweights having a cam surface engageable with the other of said second and third rotatable members upon said radially outward movement to effect said axial movement of the second rotatable member, the cam surface including a recessed portion disposed at an intermediate point thereon to resist said radially outward movement and thereby maintain said first and second members in a predetermined relative axial position through an intermediate range of rotational speed of the shaft means.

* * * * *